United States Patent [19]

Spaulding

[11] Patent Number: 4,987,652
[45] Date of Patent: Jan. 29, 1991

[54] SPRING CLAMP

[76] Inventor: George E. Spaulding, 3277 Lake Dr., S.E., Grand Rapids, Mich. 49506

[21] Appl. No.: 477,557

[22] Filed: Feb. 9, 1990

[51] Int. Cl.⁵ .......................................... B65D 63/02
[52] U.S. Cl. .............................. 24/20 R; 24/20 CW; 24/20 EE
[58] Field of Search ............. 24/20 R, 20 CW, 20 W, 24/20 EE, 20 TT, 23 W, 23 EE

[56] References Cited

U.S. PATENT DOCUMENTS

| | | | |
|---|---|---|---|
| 210,560 | 12/1878 | Robertshaw | 24/20 TT |
| 712,765 | 11/1902 | Cole | 24/20 TT |
| 1,330,737 | 2/1920 | Coffman | 24/20 EE |
| 3,358,351 | 12/1967 | Ott | 24/23 EE |
| 4,492,004 | 1/1985 | Oetiker | 24/23 W |
| 4,523,352 | 6/1985 | Wachter | 24/20 CW |
| 4,610,187 | 9/1986 | Spaulding | 81/9.3 |
| 4,712,278 | 12/1987 | Oetiker | 24/20 W |
| 4,821,379 | 4/1989 | Spaulding | 24/20 |
| 4,890,360 | 1/1990 | Calmettes et al. | 24/20 R |

FOREIGN PATENT DOCUMENTS

| | | | |
|---|---|---|---|
| 3708225 | 9/1988 | Fed. Rep. of Germany | 24/20 R |
| 365588 | 12/1962 | Switzerland | 24/20 TT |
| 932116 | 7/1963 | United Kingdom | 24/20 EE |

*Primary Examiner*—Victor N. Sakran
*Attorney, Agent, or Firm*—Price, Heneveld, Cooper, DeWitt & Litton

[57] ABSTRACT

A controlled tension limited diameter clamp is disclosed which can be closed and opened with conventional pliers. Working faces are positioned on the external surface of the clamp which can be gripped by pliers. The working faces are conveniently formed by die cutting and raising the edge of the metal.

1 Claim, 1 Drawing Sheet

SPRING CLAMP

BACKGROUND OF THE INVENTION

Spring clamps of the type similar to that disclosed in the present invention have been in use for many years. U.S. Pat Nos. 4,821,187, issued Sept. 9, 1986 and 4,610,379, issued Apr. 18, 1989, to George E. Spaulding, the inventor of the present application, disclose inventions related to this type of clamp. In the '379 patent a spring clamp is shown which has a guide on either side of the clamp edge to control the motion of the latch hook as it slides into place. The '187 patent discloses a special tool which is required for closing and opening the spring clamps of the subject patents. While these clamps have been successfully used for many years, the problem has always been present that a special tool has been required in order to close and open the clamp.

SUMMARY OF THE INVENTION

In accordance with the present invention, the known spring clamp has been improved so that it can now be closed and opened using conventional pliers The clamps no longer require a special tool and can be used by everyone having access to an ordinary pair of pliers which is a very common tool in the average person's tool box or shop.

The improved spring clamp of the present invention has an elongated steel strap having a radially outwardly offset and reentrantly turned end portion forming a latch hook and a radially extending latching surface on the strap spaced from the latch hook for cooperating with the latch hook in closing the clamp. A plurality of spaced, directed tool gripping faces are formed on the clamp which are capable of being grasped by the faces on a conventional pair of pliers for closing and opening the clamp.

DETAILED DESCRIPTION OF THE PREFERRED EMBODIMENTS

Figure 1:
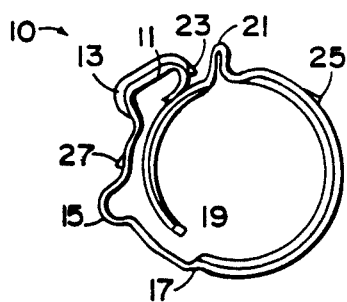
FIG. 1 is a side elevational view of a formed spring clamp showing the placement and direction of the tool gripping faces.

Referring to FIG. 1, a spring clamp is shown in the form in which it would be shipped to a user. The spring clamp is made of metal and preferably austenitic stainless steel. When formed into a clamp, one end is shaped with a radially offset and reentrantly turned latch hook 11 having a reinforcing ridge 13 along the back of the latch hook. A tensioning loop 15 is provided for the dual purpose of tolerance accommodation and maintenance of clamping tension. A radially offset shoulder 17 is formed in the clamp to form a surface against which the end of the clamp 19 can abut to form a substantially continuous smooth surface within the clamp. A projecting latch 21 is formed in the clamp metal and cooperates with the latch hook 11 to close the clamp. The clamp as so far described has been in use for many years and requires a special tool such as that shown in U.S. Pat. No. 4,610,187, issued to the present inventor. The special tool was required in order to grip the back of the latch hook 11 and the projecting latch 21 while not interfering or getting in the way as the edge of the latch hook was urged in place on the arcuate surface of the latch, gripping that surface and completing the clamping action. In opening the clamp it was necessary to use the same tool with the tool jaws turned around in order to be able to get under the edge of the latch hook 11 to cam it free from the latch 21.

In accordance with the present invention, the spring clamp has been improved by the addition of a tool gripping face 23 near the end of the latch hook 11. An additional tool gripping face 25 was added near the latch 21 and still another tool gripping face 27 was added to the clamp between the latch hook 11 and the tensioning loop 15. The tool gripping faces 23 and 25 are directed or facing in the same direction while the tool gripping face 27 is oriented in the opposite direction.

Figure 2:
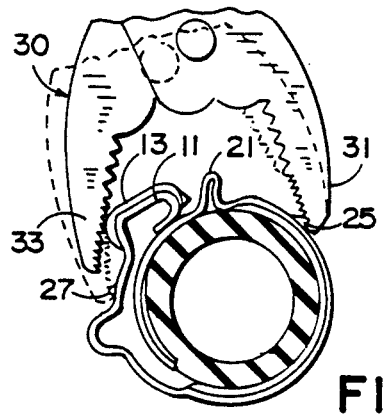
FIG. 2 is a side elevational view showing the conventional pair of pliers closing the clamp about a hose.

The working faces 23, 25 and 27 can be used along with a conventional pair of pliers, to close and open the spring clamp. In FIG. 2 the jaws of a conventional pair of pliers, indicated generally by the number 30, are shown. The pliers have a first jaw 31 in contact with the working face 25 adjacent the latch 21. The second jaw of the pliers 33 is shown gripping the reinforcing rib 13 on the outer surface of the latch hook 11. The jaw 33 of pliers 30 can also be used to grip the face 27, as shown in phantom in FIG. 2, instead of the rear of the latch hook 11 when the geometry of the clamp dictates such as in large diameter clamps. The closing of the jaws 31 and 33 will cause the latch hook 11 to be cammed up and over the latch 21 where it will be held firmly in place by the curved surface of the latch 21. The jaws of the pliers do not grip the latch 21 so they do not interfere with the coming together of the latch hook 11 and latch 21.

Figure 3:
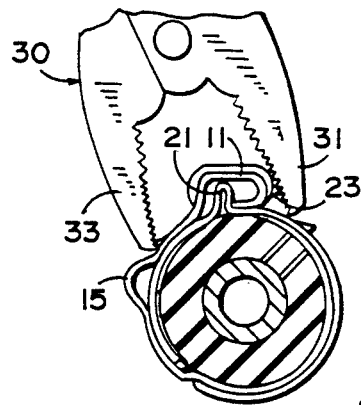
FIG. 3 is a side elevational view showing a conventional pair of pliers gripping the working faces on the clamp prior to opening the clamp.

When it is desired to open the spring clamp, referring to FIG. 3, the jaw 31 of the pliers now grips the working face 23 on the end of the latch hook 11 while the second jaw of the pliers 33 grips the working face 27 between the tensioning loop 15 and the latch hook 11. With the pliers 30 in this position, the jaw 31 can pry the latch hook 11 up and away from the latch 21 while the jaw 33 acts as a fulcrum for the opening motion at face 27.

Figure 4A:
FIG. 4A, 4B and 4C show how the metal of the spring clamp is cut and raised to form the tool gripping faces.
Figure 4B:
Figure 4C:
Figure 4:
FIG. 4 is a top plan view of a spring clamp blank showing the location of the several tool gripping faces.
Figure 5:
FIG. 5 is a side elevational view of the spring clamp blank showing the orientation of the tool gripping faces.

The tool gripping faces 23, 25 and 27 are preferably added to the spring clamp 10 during the course of manufacture before the spring clamp material is rolled. Referring to FIGS. 4, 4a, 4b, 4c and 5, it can be seen that the tool gripping faces are preferably added to the clamp blank 10 by die cutting and raising a portion of the center of the steel strap. In FIG. 4, the edge of the die cuts the arcuate edge of the gripping face and then pushes to raise the metal in the area bounded by the pierced or sheared arcuate line. Other metal fabricating techniques can be used to form raised areas on the strap such as stamping, spot welding and riveting. The particular technique employed is not critical to the present invention. As shown in FIGS. 4a and 5, tool gripping face 25 is cut into the metal so that the edge of the tool gripping face 25 faces in the direction of the latch hook portion of the spring clamp. In FIGS. 4b and 5, the tool gripping face 27 is added in a similar manner; however, the materials are raised and face away from the latch hook 11. In FIGS. 4c and 5, it can be seen that the tool gripping face 23 is added to the raised portion 13 of the latch hook 11 and will face away from the clamp when the latch hook is formed. In each case, the tool gripping face is raised approximately 20° relative to the surface of the clamp. Any of several well-known makes of multi-slide presses can be used to process strip steel from reels. The press can pierce the strip to form the gripping face, add the clamp features and then roll the blank into the final configuration, shown in FIG. 1, where it is ready for use.

The clamps can be made in many different sizes or lengths in order to be used with different size hoses. Regardless of the length of the clamp, the working faces should preferably be in the same spatial relationship relative to the latch hook and latch. For example, referring to FIG. 1, the length of the steel strap between the shoulder 17 and the working face 25 can be made of any desired length. The spatial relationship of the features of the spring clamp making up the latch hook, the latch and the working faces remains substantially the same. Following this guideline, the same pliers can be used to open and close the full range of sizes of spring clamps Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A spring clamp comprising:
   an elongated substantially rectangular piece of metal having a latch hook at one end and a projecting latch near the opposite end such that when formed into a substantially circular configuration said latch hook can grip and contain said projecting latch to hold said clamp in position about an object to be clamped; and
   a plurality of spaced projecting tool gripping surfaces on said rectangular piece of metal to enable said spring clamp to be opened and closed by a conventional pliers, one of said spaced projecting tool gripping surfaces is positioned on the end of said latch hook, a second one of said plurality of gripping faces is positioned adjacent the back of said latch hook and a third one of said plurality of gripping faces is positioned near said projecting latch, said tool gripping surface on said latch hook is oriented in a first direction and said tool gripping face adjacent said latch hook is oriented in a direction opposite to said first direction.

* * * * *